D. S. REGAN.

Assignor, by direct and mesne assignments, to the REGAN VAPOR ENGINE COMPANY.

GAS ENGINE.

No. 11,068. Reissued Apr. 1, 1890.

Attest
Walter Malcolm
Leo. F. Coy

Inventor
D. S. Regan
by Apps & Duty
Attys

UNITED STATES PATENT OFFICE.

DANIEL S. REGAN, OF SAN FRANCISCO, CALIFORNIA, ASSIGNOR, BY DIRECT AND MESNE ASSIGNMENTS, TO THE REGAN VAPOR ENGINE COMPANY, OF SAME PLACE.

GAS-ENGINE.

SPECIFICATION forming part of Reissued Letters Patent No 11,068, dated April 1, 1890.

Original No. 408,356, dated August 6, 1889. Application for reissue filed March 3, 1890. Serial No. 342,484. Patented in England October 27, 1888, No. 15,448.

*To all whom it may concern:*

Be it known that I, DANIEL S. REGAN, a citizen of the United States, and a resident of the city and county of San Francisco, and State of California, have invented certain new and useful Improvements in Gas-Engines, (for which I have obtained Letters Patent in Great Britain, No. 15,448, October 27, 1888,) of which the following is a specification.

My invention relates to improvements in gas-engines; and it consists in making the piston a part of the electric circuit and fixing one of the electrodes to it, while the other electrode, properly insulated, is so arranged within the cylinder as to be touched by the piston-electrode at each stroke, so that the circuit is closed and broken at each stroke of the piston.

It further consists in an electrode mounted within the engine-cylinder, said electrode being a flexible spring adapted to be struck directly by a projection on the piston and to yield to its impact.

The object of my invention is to provide an explosive gas-engine with an igniting device the operation of which shall be dependent upon the movements of the engine-piston, and to close and open the electrical circuit by the stroke of the piston.

Figure 1:
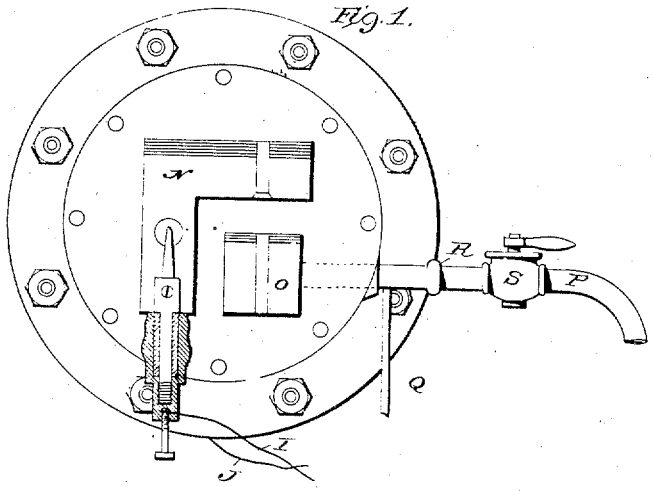
Figure 2:
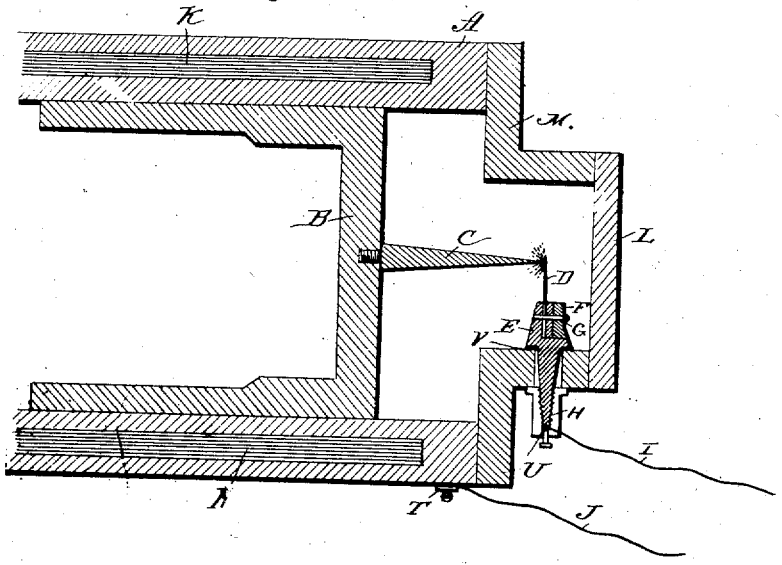

In the drawings, Figure 1 is an elevation showing the head of the engine with the cap of the igniting-chamber and the valve-chamber removed. Fig. 2 is a broken longitudinal sectional view showing the cylinder cut vertically through the center.

A represents the cylinder; B, the piston; C, the projection upon and moving with the piston; D, the yielding spring-electrode; E, the insulated spring-holder; F, the clamping-block for the spring; G, the set-screw for clamping the spring D and holding the same.

H represents the set-nut for attaching the insulated spring-holder E and receiving the electric wire I, which connects with one pole of the battery.

J represents one of the electric wires.

K represents the water-jacket or water-space.

L represents the cap for the igniting-chamber.

M represents the cylinder-head.

N represents the igniting-chamber.

O represents the valve-chamber.

P represents the gas-supply pipe.

Q represents the air-supply pipe.

R represents the check-valve.

S represents the throttle-valve.

T represents the binding-screw for the electric wire J.

U represents the connection of the electric wire with the insulated spring-holder, and V represents the insulator.

In the operation of the device, the wires being connected to any suitable battery or other form of electric generator, one pole is connected directly with the cylinder at T and the other pole with the insulated spring-holder at U. I thoroughly insulate the spring-holder E by means of the insulator V and attach any suitable metal spring D so as to be struck by the projection C at each stroke of the piston. The effect of this is to successively close and open the circuit, the breaking of the circuit producing the spark necessary for igniting the gas in the explosion-chamber.

It will be observed that the terminal electrode D is a strip of elastic metal, which, when mounted in the path of the projection on the piston, yields to the impact of the latter at each stroke, preventing the jar which would otherwise accompany the forcible blow of the piston. The spring thus constitutes in itself not only a terminal electrode, but a yielding cushion for the piston and in a simple, cheap, durable, and highly-effective manner.

Having thus described my invention, what I claim, and desire to secure by Letters Patent, is—

1. In a gas-engine, an electrical circuit including the engine-piston, an electrode fixed to the piston and reciprocating with it, and a second electrode fixed within the explosive chamber of the engine and insulated therefrom, whereby the electrical circuit is closed and broken at each stroke of the piston, as described.

2. In a gas-engine, an electrical circuit including the engine-piston and electrode fixed to and reciprocating with the piston, in combination with a second insulated flexible electrode fixed within the engine-cylinder, so that contact is made and broken between the two electrodes at each stroke of the piston, as herein described.

3. In a gas-engine, the spring D, the insulated spring-holder E, having the clamp-block F, and the set-nut H, connected with one pole of an electric battery, in combination with a connecting-finger C, attached to the piston B, and the cylinder A, connected with the battery by means of the electric wire J, for the purpose of making the circuit by direct connection with the piston at each stroke of the same, constructed and operated substantially as and for the purposes set forth.

4. In a gas-engine, a strip of flexible metal constituting an electrode and supported by and within the engine-cylinder, in combination with the piston having a projection adapted to strike such spring at each stroke, substantially as set forth.

5. In a gas engine, a strip of flexible elastic metal constituting an electrode and supported by and within the engine-cylinder and in an electrical open circuit, in combination with the piston having a projection adapted to strike such spring to successively close and open the circuit at each stroke, substantially as set forth.

6. In a gas-engine, a strip of flexible elastic metal insulated from the engine-cylinder and supported by and within said cylinder in the path of its reciprocating piston, substantially as described.

DANIEL S. REGAN.

Witnesses:

L. MEININGER,

D. STEIN.